(12) United States Patent
Johansson et al.

(10) Patent No.: US 9,979,903 B2
(45) Date of Patent: May 22, 2018

(54) STRAY LIGHT COMPENSATION TECHNIQUES FOR AN INFRARED CAMERA

(71) Applicant: FLIR Systems AB, Täby (SE)

(72) Inventors: Emanuel Johansson, Hjarup (SE); Odd Larson, Taby (SE); Stefan Olsson, Stockholm (SE)

(73) Assignee: FLIR Systems AB, Taby (SE)

( * ) Notice: Subject to any disclaimer, the term of this patent is extended or adjusted under 35 U.S.C. 154(b) by 0 days. days.

(21) Appl. No.: 15/425,913

(22) Filed: Feb. 6, 2017

(65) Prior Publication Data

US 2017/0150070 A1 May 25, 2017

Related U.S. Application Data

(60) Division of application No. 14/222,539, filed on Mar. 21, 2014, now Pat. No. 9,565,371, which is a continuation-in-part of application No. PCT/SE2012/000136, filed on Sep. 13, 2012.

(30) Foreign Application Priority Data

Sep. 22, 2011 (SE) ...................................... 1130090

(51) Int. Cl.
  *H04N 5/33* (2006.01)
  *H04N 5/235* (2006.01)
  *G06T 7/00* (2017.01)

(52) U.S. Cl.
  CPC ............. *H04N 5/33* (2013.01); *G06T 7/0002* (2013.01); *H04N 5/2352* (2013.01); *G06T 2207/20048* (2013.01)

(58) Field of Classification Search
  CPC ...... H04N 5/33; H04N 5/2176; H04N 5/3651; H04N 5/2352; G06T 7/0002; G06T 2207/20048
  USPC .................................................... 348/164–168
  See application file for complete search history.

(56) References Cited

U.S. PATENT DOCUMENTS

| | | | | |
|---|---|---|---|---|
| 5,376,793 A | * | 12/1994 | Lesniak | G01N 25/72 250/330 |
| 5,994,701 A | * | 11/1999 | Tsuchimoto | G01J 5/08 250/252.1 |
| 6,023,061 A | | 2/2000 | Bodkin | |
| 6,677,588 B1 | | 1/2004 | Granneman | |

(Continued)

FOREIGN PATENT DOCUMENTS

EP    1253779    10/2002

*Primary Examiner* — William C Vaughn, Jr.
*Assistant Examiner* — Jae N Noh
(74) *Attorney, Agent, or Firm* — Haynes and Boone, LLP

(57) ABSTRACT

Various techniques are provided for a stray light compensation method for an infrared (IR) camera. For example, a stray light compensation method includes: capturing an IR image of a scene by an IR camera, generating a fixed pattern noise estimate $FPNest_{t0}$ for time t0 using the captured IR image and a stray light model associated with the IR camera, and performing a fixed pattern noise (FPN) compensation of the captured IR image based on said $FPNest_{t0}$ to obtain a stray light compensated IR image. The fixed pattern noise estimate may be generated through operations in a frequency domain representation of the captured IR image and the stray light model according to one or more embodiments.

18 Claims, 7 Drawing Sheets

(56) References Cited

U.S. PATENT DOCUMENTS

| | | |
|---|---|---|
| 2002/0162963 A1 | 11/2002 | Lannestedt et al. |
| 2003/0169345 A1 | 9/2003 | Rykowski et al. |
| 2006/0279632 A1* | 12/2006 | Anderson ................ H04N 5/33 348/164 |
| 2007/0247672 A1 | 10/2007 | Nguyen |
| 2008/0048121 A1* | 2/2008 | Hinnrichs ............... G01J 5/061 250/340 |
| 2008/0210872 A1* | 9/2008 | Grimberg ................ G01J 5/522 250/339.04 |
| 2009/0059210 A1 | 3/2009 | Zong et al. |
| 2011/0007166 A1* | 1/2011 | Forestier ................ G02B 13/14 348/164 |
| 2012/0169866 A1* | 7/2012 | Schmidt ................. H04N 5/33 348/135 |

* cited by examiner

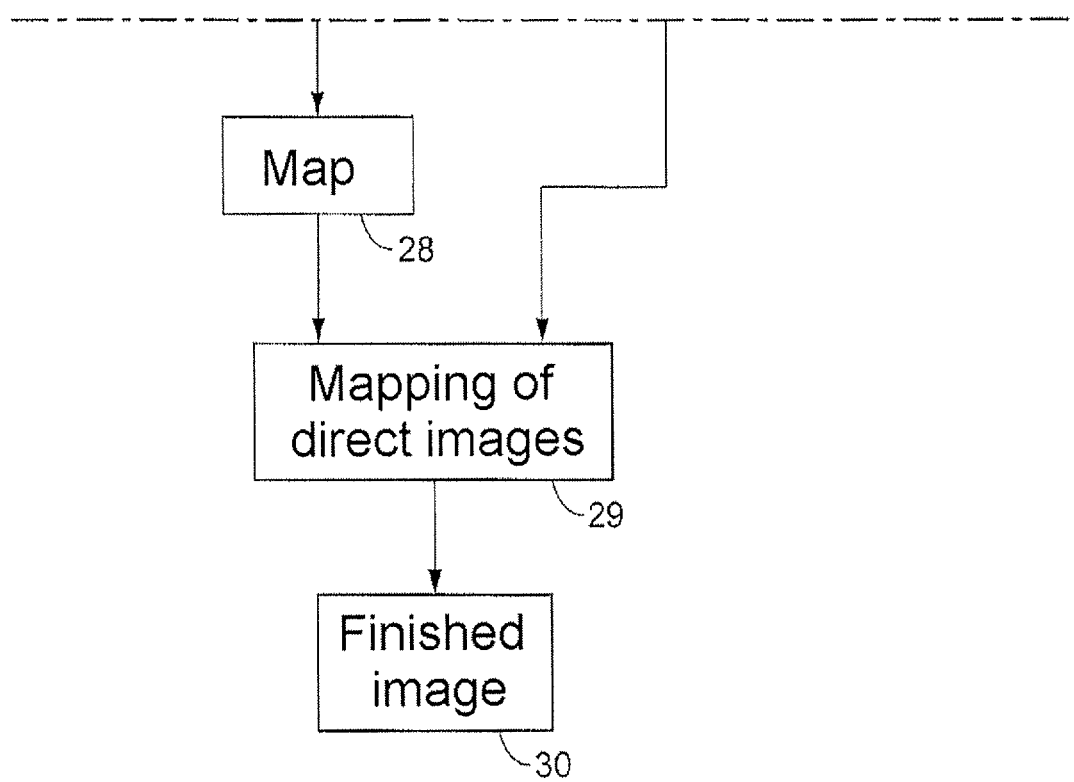

STRAY LIGHT COMPENSATION TECHNIQUES FOR AN INFRARED CAMERA

CROSS-REFERENCE TO RELATED APPLICATIONS

This application is a divisional of U.S. patent application Ser. No. 14/222,539 filed Mar. 21, 2014, issued as U.S. Pat. No. 9,565,371 on Feb. 7, 2017, and entitled "STRAY LIGHT COMPENSATION TECHNIQUES FOR AN INFRARED CAMERA" which is hereby incorporated by reference in its entirety.

U.S. application Ser. No. 14/222,539 is a continuation-in-part of International Patent Application No. PCT/SE2012/000136 filed Sep. 13, 2012 and entitled "PROCESS FOR STRAY LIGHT COMPENSATION OF AN IR CAMERA" which is hereby incorporated by reference in its entirety.

International Patent Application No. PCT/SE2012/000136 claims the benefit of Swedish Patent Application No. SE 1130090-2 filed Sep. 22, 2011, which is hereby incorporated by reference in its entirety.

TECHNICAL FIELD

One or more embodiments of the invention relate generally to infrared (IR) image processing and more particularly, for example, to IR image processing techniques to compensate for stray light in IR cameras.

BACKGROUND

A common way of offset-calibrating an IR camera is to calibrate against an insertable spade. An example of a realization comprising a spade is described in US 2002/0162963 A1.

One problem with IR cameras provided with a spade and, in particular, with uncooled IR cameras is spatial noise ("fix pattern noise", FPN) should the camera, and in particular the spade, not have the same temperature as the scene which the camera is viewing. Moreover, the spade with associated transport mechanisms constitutes a significant part of the production cost of the camera.

In order to get around the problem of a warm spade, it has previously been known to use the scene temperature in the calibration without being affected by objects in the scene. For this, it is necessary to be able to make a so-called NUC (Non Uniformity Correction). This requires the camera to be able to be directed towards a plane surface which has the same temperature as the scene. A surface which can be used in certain cases has been the sky.

It is also known to offset-calibrate an IR camera by moving one or more lenses in the camera in order to defocus the scene as much as possible and make the calibration against this almost uniform scene. The use of defocusing in connection with offset calibration is described, inter alia, in FR 2 928 462 A1. According to the said document, lenses are moved in the optical path for calibration by defocusing.

An offset calibration against the defocused scene removes, inter alia, the high-frequency noise and corrects for the characteristics of integral detectors. On the other hand, there remain problems with the stray light, since stray light in the defocused state looks different from in the focused state. This results in the addition of a new stray light, originating from the defocused state, to the stray light in the focused state.

SUMMARY

Various techniques are disclosed for a process that can compensate for low-frequency noise in the form of stray light in a camera. For example, a process according to one or more embodiments of the disclosure may be characterized in that:

a) stray light images are measured in production for at least two different camera temperatures against flat radiators and stored, b) the stray light is measured directly in image during operation for a selection, such as one or more lines, a few points or the whole image and the made selection is low-pass filtered, c) corresponding selections are made in the stray light images, d) the selection from the stray light is matched against corresponding selections in the stray light images by calculating the factor which makes the most points from the selections coincide, e) image during operation is compensated with calculated factor of matched stray light image.

The process serves to ensure that low-frequency scene content does not destroy the measurements and that very noise-free images can be generated.

According to one embodiment, it is proposed that points in the selection from the stray light which deviate from the stray light form according to the selection in the stray light images are eliminated. Stray light has a characteristic form which means that deviant forms can be identified and excluded. Examples of deviant forms can be square notches, steep peaks and the like. By first removing parts which deviate from the stray light form, a subsequent matching is facilitated and a more effective stray light compensation is achieved.

According to another embodiment, it is proposed that the selection directly in image is constituted by the two diagonal lines of the image. By making a diagonal selection, the image is covered from corner to corner and a very representative selection is obtained under normal conditions without needing to manage excessively large quantities of data, which facilitates compensation virtually in real time.

According to an alternative embodiment to the embodiment according to the previous paragraph, the selection directly in image is constituted by at least one horizontal line and at least one vertical line in the image. This selection too covers the image in an advantageous manner without the need to manage excessive quantities of data.

The calculation of the factor which makes the most points from the selections coincide is advantageously conducted using the least squares method. Other calculation methods can also be applied, however.

According to another embodiment, in which an offset map is made during operation against a defocused scene or against a spade, low-pass noise is eliminated by virtue of the fact that the offset map is high-pass filtered and that the offset map is compensated with calculated factor of matched stray light image. The high-pass filtering prevents the addition of new stray light emanating from calibration against defocused scene or against spade.

According to a further embodiment, the low-frequency noise is compensated to a still higher degree by virtue of the fact that offset maps are generated in production for compensation of low-frequency noise in the detector.

The stray light compensation can be carried out separately in operation or can be coordinated with other activities. A preferred refinement of the process is to carry out the stray light compensation in connection with offset calibration in operation.

The stray light compensation can be carried out, for example, in combination with optical NUC or spade-based NUC.

Stray light images which are measured in production should be made for at least two camera temperatures. It is especially proposed that stray light images are measured in production for at least three camera temperatures, of which one camera temperature corresponds to room temperature and at least one camera temperature is lower and at least one camera temperature is higher than the room temperature.

According to an alternative embodiment of the process, a fixed pattern noise estimate (FPNest) may be obtained and utilized to compensate an IR image for stray light. For example, in one embodiment, a process may include:

capturing an IR image of a scene by an IR camera;

generating a fixed pattern noise estimate $FPNest_{t0}$ for time t0 using the captured IR image and a stray light model for the IR camera; and performing a fixed pattern noise (FPN) compensation of the captured IR image based on said $FPNest_{t0}$ to obtain a stray light compensated IR image.

According to one or more embodiments, the fixed pattern noise estimate may be generated through operations in a frequency domain representation of the captured IR image and the stray light model according to one or more embodiments. For example, in one embodiment, the process may further include:

performing a transform on said captured IR image to a frequency domain thereby obtaining an IR image frequency pattern, wherein the IR image frequency pattern comprises frequency components with associated frequency component amplitudes and a center frequency, and wherein the stray light model and the transformed IR image have frequency patterns with the same number of and corresponding frequency components;

generating a truncated IR image frequency pattern by setting the frequency component amplitudes of the transformed IR image frequency pattern corresponding to non-principal components of the stray light model to zero;

performing an inverse frequency transform on the truncated IR image frequency pattern to obtain a fixed pattern noise estimate $FPNest_{t0\_delta}$ for time t0; and determining the fixed pattern noise estimate $FPNest_{t0}$ for time t0 based on said fixed pattern noise estimate $FPNest_{t0\_delta}$ for time to.

In one or more embodiments of the present invention, stray light compensation is performed without using a shutter, by direct processing of the image data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 3a and 3b illustrate in a block flow diagram an example of a process according to the invention for the compensation of stray light and thus also for the management of other noise. The transition between FIG. 3a and FIG. 3b is shown in the drawings by means of a dash-dotted line.

Embodiments of the invention and their advantages are best understood by referring to the detailed description that follows.

DETAILED DESCRIPTION

Detectors incorporated in a detector matrix of an IR camera do not behave equally but have variations in amplification and offset. In order to manage these variations, so-called gain and offset maps are recorded and stored preferably already in production. With the aid of the gain map, corrections are made during operation for amplification variations of the individual detectors in a matrix. Correspondingly, the offset map is used, during operation, for the parallel displacement of the detector signals of integral detectors such that the amplification curves of the detectors substantially coincide. In order to further clarify the principles behind gain and offset mapping, reference is made to our published US patent application US 2011/0164139 A1.

Figure 1:
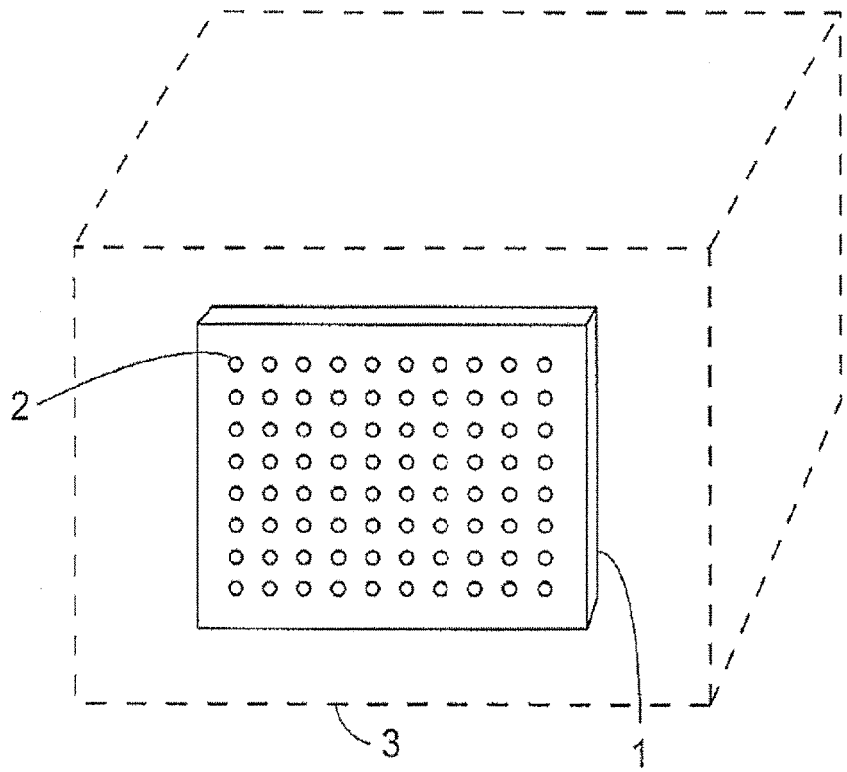
FIG. 1 shows schematically a detector matrix to be housed in an IR camera.

In FIG. 1 is schematically illustrated a detector matrix 1 housed in an IR camera which has merely been outlined in box form with dashed lines. The detector matrix 1 comprises rows and columns of detectors 2, the gain and offset maps of which, after having been recorded in production, have been stored and have here been illustrated in FIG. 2 with a memory circuit 4 accommodating the gain map 5 and offset map 6. In addition, there is space for storage of stray light images, as will be described in greater detail in different context below. Even though the memory circuit has been shown as a separate unit, maps and stray light images can be stored separately. Acting as the memory circuit can be any type of memory which is suitable in this context and, for example, types of memory which are suited to interactions with microprocessors.

Figure 3A:
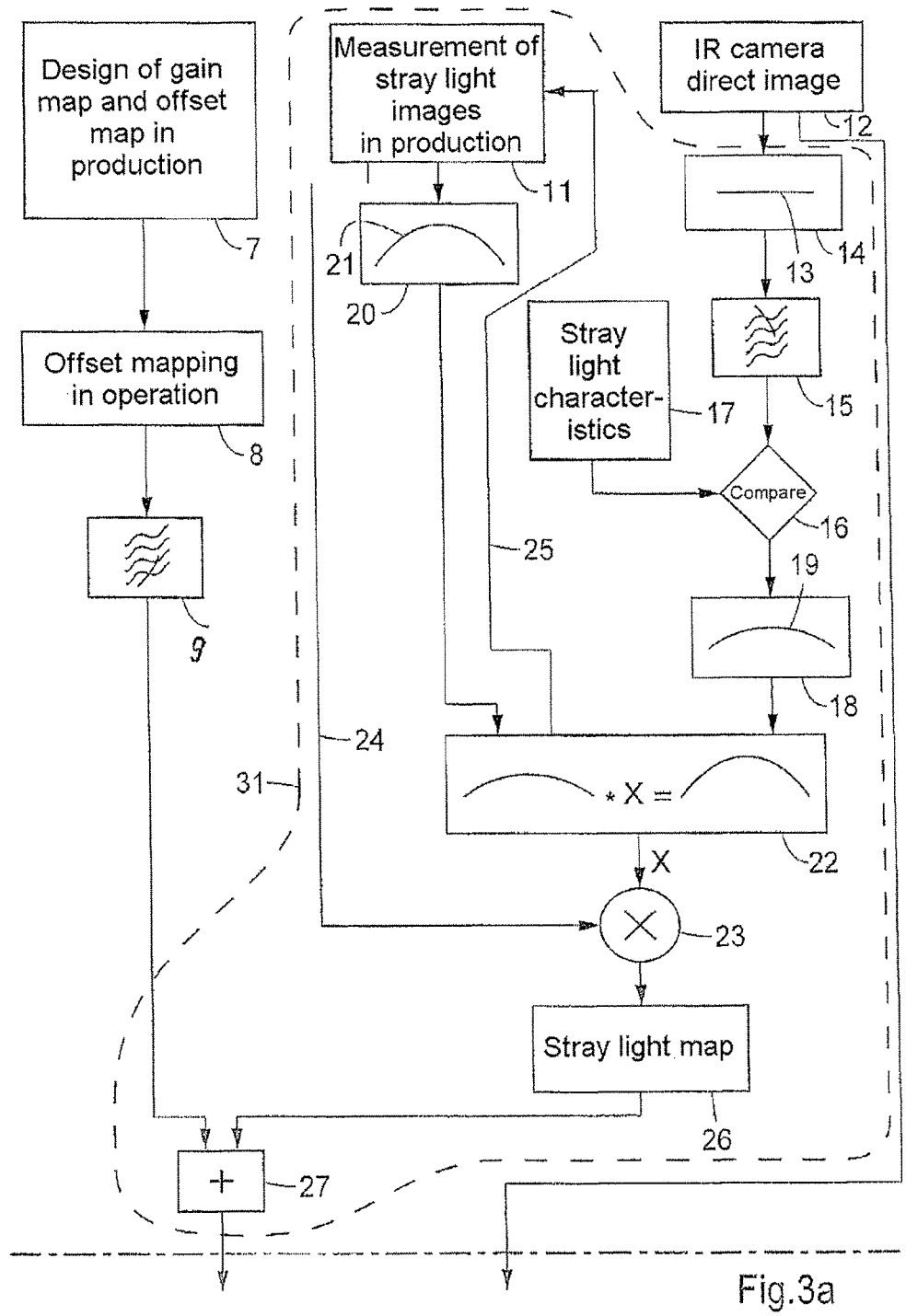

With reference to a schematic flow diagram shown in FIGS. 3a and 3b, the principles for stray light compensation, and therewith associated mapping, are now described. In order to more clearly mark the stray light compensating part, it has been ringed by means of a dashed loop 31.

In connection with the production of an IR camera 3, gain and offset maps 5, 6 are expediently recorded. The block 7 in FIG. 3 illustrates this mapping in production. Furthermore, offset mapping is carried out during normal operation of the IR camera. This is illustrated by block 8. The offset mapping can be carried out according to the principle for optical NUC, i.e. by defocusing the scene shown by the IR camera, for example by moving optical elements such as lenses, and carrying out the mapping against the defocused scene having high uniformity. Another possible principle is spade-based NUC, where a spade-like object is introduced into the ray path in the recording of an offset map.

In order to eliminate low-frequency contributions from the scene and from the optics in the defocused state, according to block 9 a high-pass filtering is carried out. An offset map which from the noise aspect can favourably manage the high-frequency noise is thereby produced.

Figure 2:
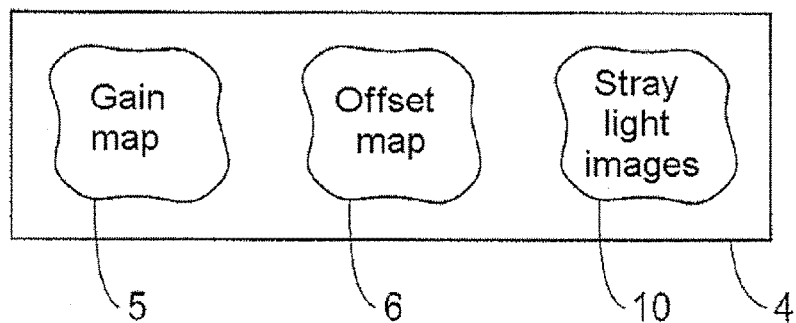
FIG. 2 shows schematically a memory circuit.

In order to manage stray light, stray light images are measured in production for different temperatures against flat radiators and stored in a memory, such as the memory 4 shown in FIG. 2 having a section 10 for stray light images. The procedure for measuring stray light images is illustrated in FIG. 3a with the block 11. The stray light measurement calls for measurement at at least two temperatures. It can be expedient to cover a temperature range of perhaps 40 degrees, with measuring points of, for example, +10 degrees and +35 degrees. In order to increase the accuracy, measurement can be realized at more than two measuring points, which, in particular, would be likely to give a more effective stray light compensation out in the edges of an image. It is especially proposed to locate a measuring point at room temperature.

A block 12 illustrates an image in the IR camera 3, which image is accessible during operation.

In order to establish the magnitude of the stray light, a matching of stored stray light images takes place, block 11, with the particular direct image, block 12, according to the principles described below.

Starting from the particular direct image, a selection is first made. The selection can be made such that one or more lines in the image, a few points or the whole of the image are processed. By limiting the selection to some lines or a few points, the calculation time can be kept down. It is especially proposed to choose the two diagonals in the image. Other suitable choices can be some parallel lines and some horizontal lines.

For the sake of clarity, a selection which is constituted by a single horizontal line 13 shown in a block 14 in order to show the principle behind the stray light compensation is described below. Such a horizontal line, like other selection examples, also contains scene content which has nothing to do with the stray light. In order to separate the stray light information from the rest of the image, a low-pass filtering of the horizontal line, see block 15, is first carried out. After this, it can be checked whether the low-pass filtered line has a form which coincides with the form for stray light. Points which markedly deviate, for example square notches or steep peaks, are eliminated. A block 16 indicates a comparison between the low-pass filtered horizontal line and characteristics for a stray light form acquired from block 17. After low-pass filtering and elimination of any points, a line 19 is obtained, which line can have a curve shape schematically shown in the block 18.

Stray light images which have been taken during the production phase have previously been stored. The block 11 makes such images available and a corresponding line 21 in the stray light images is produced and exemplified schematically in block 20.

A line 19 representing part of the direct image of the IR camera and lines 21 representing known curves from stray light images now exist. In a block 22, the curve shape of the line 19 is matched against the curve shapes of the lines 21 by calculating the factor X which makes the most pixels from the curves coincide. The calculation can be conducted by means of the least squares method. Block 22 illustrates the equation set-up and supplies the calculated factor X. The block 22 can also include the conductance of a reasonability assessment of the calculated factor X.

The produced factor X is next multiplied by the stray light image which best corresponds to the line 19, see block 23. A connection 24 here shows that the stray light image can be fetched from the block 11, and a connection 25 indicates the particular stray light image. As a result of the multiplication, a stray light map, marked by a block 26, is obtained. This stray light map is placed in a block 27 together with an offset map generated in block 8 and high-pass filtered in block 9, to form a map 28 which is applied in a block 29 to the direct image of the IR camera represented by block 12, resulting in a finished image, block 30, compensated for stray light and other, both low-frequency and high-frequency noise.

A problem with IR cameras is stray light, wherein stray light is light in an optical system, which was not intended in the design. The light may be from the intended source, but follow paths other than intended, or it may be from a source other than the intended source. This light may set a working limit on the dynamic range of the IR imaging system; it limits the signal-to-noise ratio or contrast ratio. To compensate for this phenomenon, various techniques disclosed herein aim at providing stray light compensation.

When the stray light changes in an infrared camera system, the aperture shading effect, Narcissus effects and optics may give rise to a low frequency fixed pattern noise (FPN) in infrared images. In a cooled IR camera, the frequency of the noise is related to the dimensions of the cold shield and the distance to the detector, such as a focal plane array, FPA, but also to the optics. The amplitude and sign of the noise depends on the amount of stray-light in the system. In conventional systems, this may compensated for by performing a Non-Uniformity Correction (NUC) with a shutter (e.g., a spade). In one or more embodiments of the present invention, stray light compensation is performed without using a shutter, by direct processing of the image data.

With reference now to FIGS. 4 through 7, various alternative embodiments of a process to compensate for stray light in IR images are discussed. Embodiments discussed below may compensate for stray light by generating an estimate of fixed pattern noise (FPNest) in a captured IR image due to stray light, which is in turn removed from the captured IR image to generate an FPN compensated IR image.

Figure 4:
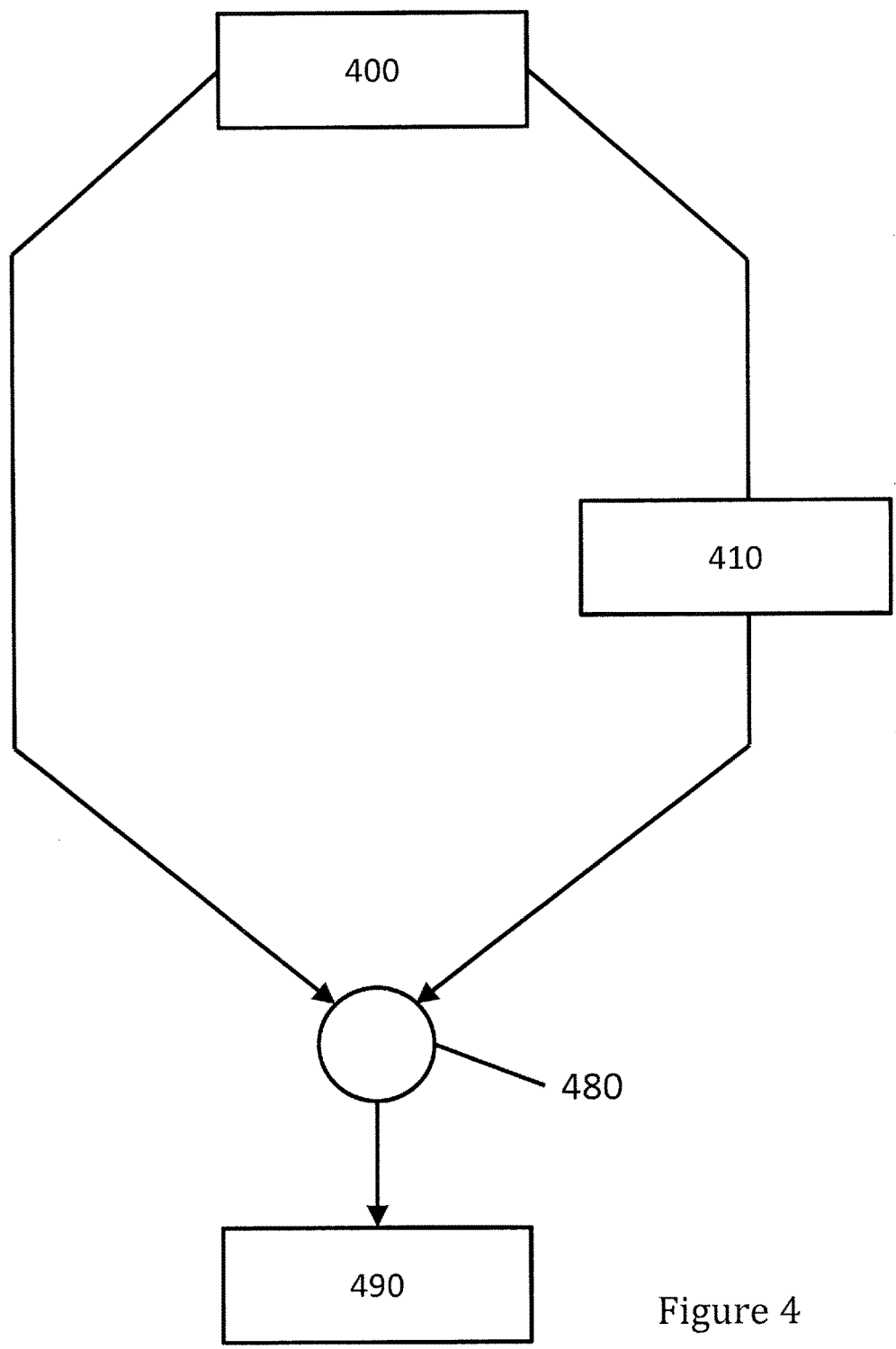
FIG. 4 shows a flow chart of one or more embodiments of a method for stray light compensation for an IR camera.

FIG. 4 show a flow chart of a method for stray light compensation for an IR camera in accordance with one or more embodiments of the present disclosure. For example, the method according to FIG. 4 may comprise:

At block S400, capturing an IR image of a scene;

At block S410, generating a fixed pattern noise estimate $FPNest_{t_0}$ for time $t_0$ using the captured IR image and a stray light model; and At block S480, performing a FPN compensation of the captured IR image based on said $FPNest_{t_0}$ to obtain a stray light compensated IR image 490.

In one non-limiting example, the FPN compensation may be performed by reducing data values of the captured IR image with data values of the $FPNest_{t_0}$. In one or more embodiments, the stray light model may be associated with an IR camera that captured the IR image, as further described below.

Generating a Fixed Pattern Noise Estimate

At the time of production of the IR camera, IR images with stray light present may be captured, which may then be transformed into a frequency domain (e.g., by a Discrete Cosine Transform (DCT), a Fast Fourier Transform (FFT), or other suitable transform) and stored in a memory (e.g., memory circuit 4) in the IR camera as stray light models.

It should be noted that while the generation of stray light images according to block 11 of FIG. 3a above required measurement for at least two temperatures, the stray light models discuss with reference to FIGS. 4 through 7 do not have such a requirement. Further, although the generation and storage of the stray light models and the stray light images are mentioned in connection with the time of production of IR cameras, it should be noted that the stray light images and the stray light models may be generated and stored as part of calibrating the IR cameras during or after the fabrication of IR cameras. Thus, the time of production referred to herein in connection with the stray light models and the stray light images should be understood to include any time an IR camera is calibrated after it is fabricated, and not limited to the time that the IR camera is actually fabricated or manufactured.

Figure 5:
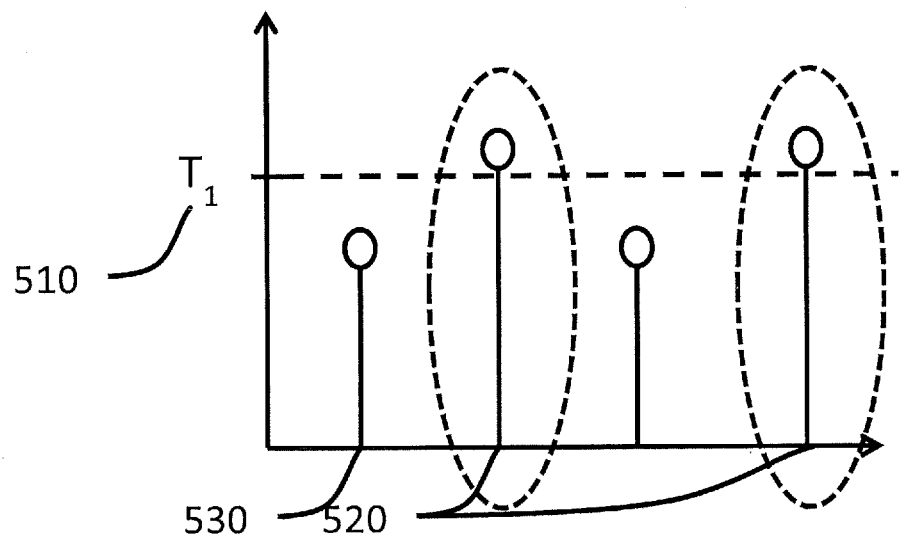
FIG. 5 shows a block flow diagram illustrating an example of a process for stray light compensation for an IR camera, in accordance with an embodiment of the present disclosure.
Figure 5:
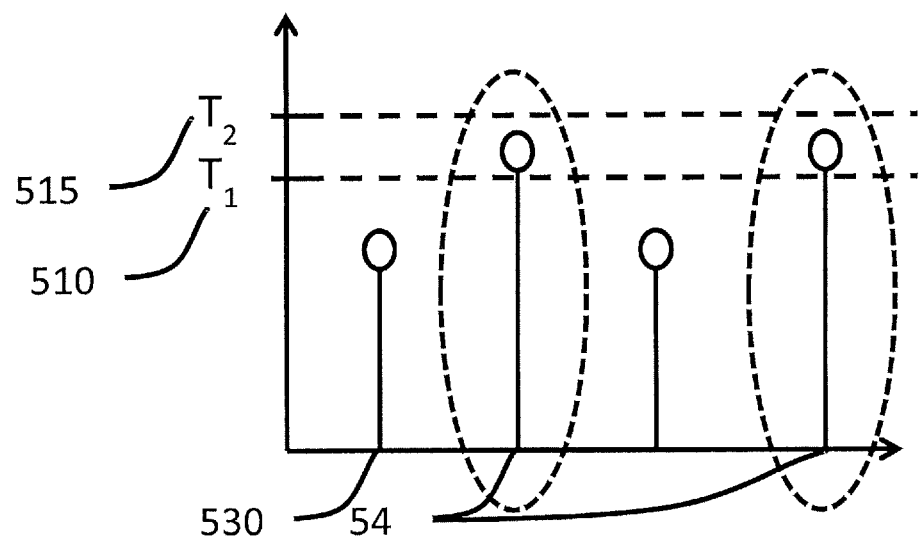

FIG. 5 further illustrates an example of how principal components of the stray light model are determined, wherein the stray light model is transformed to a frequency domain as a frequency pattern with frequency components, in accordance with one or more embodiments of the disclosure. In some embodiments, frequency components 520 with amplitude values larger than or equal to a predefined first threshold value 510 ($T_1$) may be selected as principal components. In some embodiments, frequency components 540 with amplitude values within preset interval between a predefined first threshold value 510 ($T_1$) and a predefined second threshold value 515 ($T_2$) may be selected as principal components. The remaining frequency components 530 are determined as non-principal components.

In one or more embodiments, the stray light model amplitude values are quantified to a value of one representing a principal component amplitude value and a value of zero representing a non-principal component amplitude value.

In one or more embodiments, a shape coefficient mask may be generated in which principal components are represented as a value of one and non-principal components are presented as a value of zero. Such a shape coefficient mask be applied to a frequency domain representation of an image to truncate (e.g., reduce to zero or other insignificant value) those frequency components in the image that correspond to non-principal components, for example.

Figure 6:
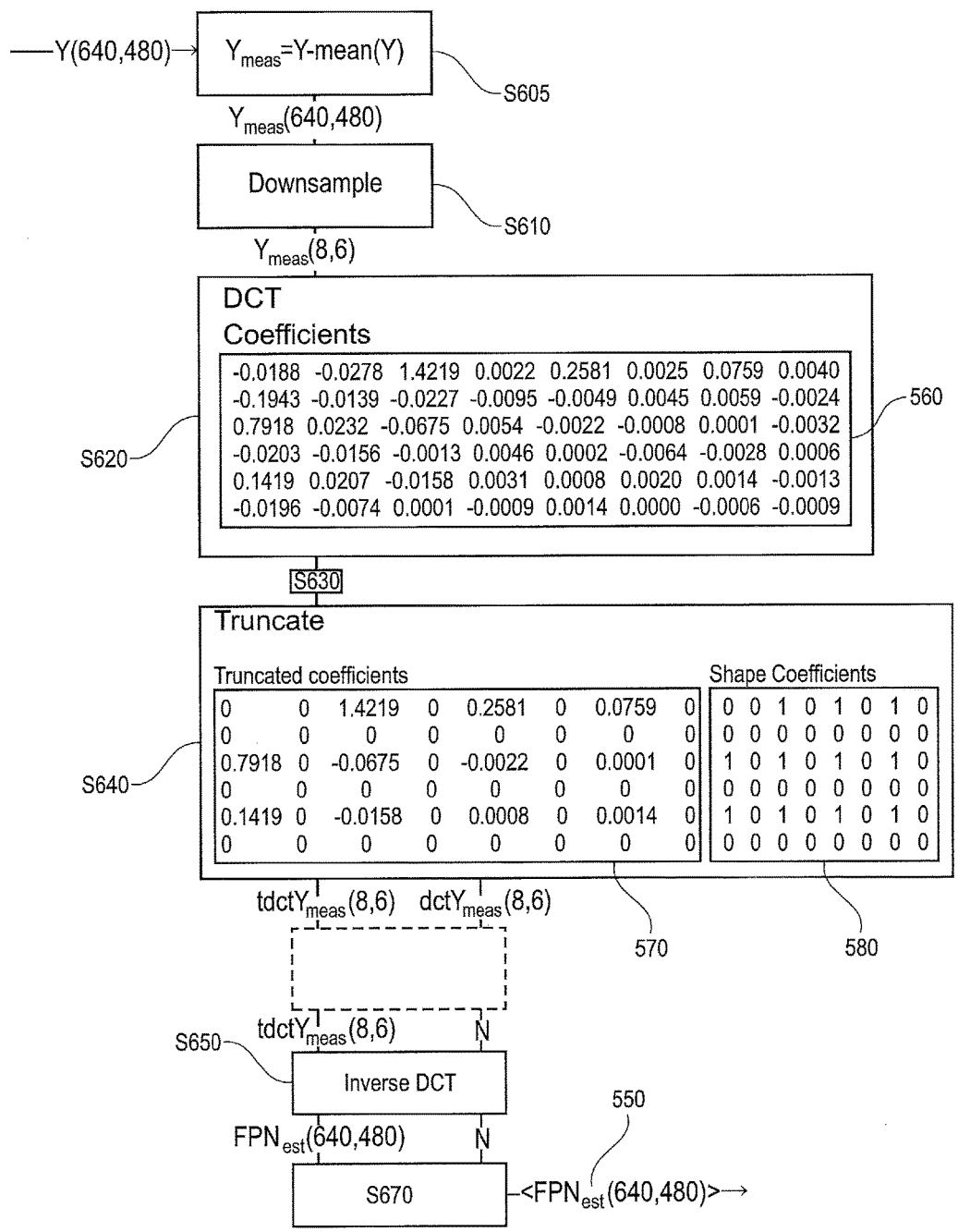
FIG. 6 shows a flow chart of one or more alternative embodiments of a method for stray light compensation for an IR camera.
Figure 7:
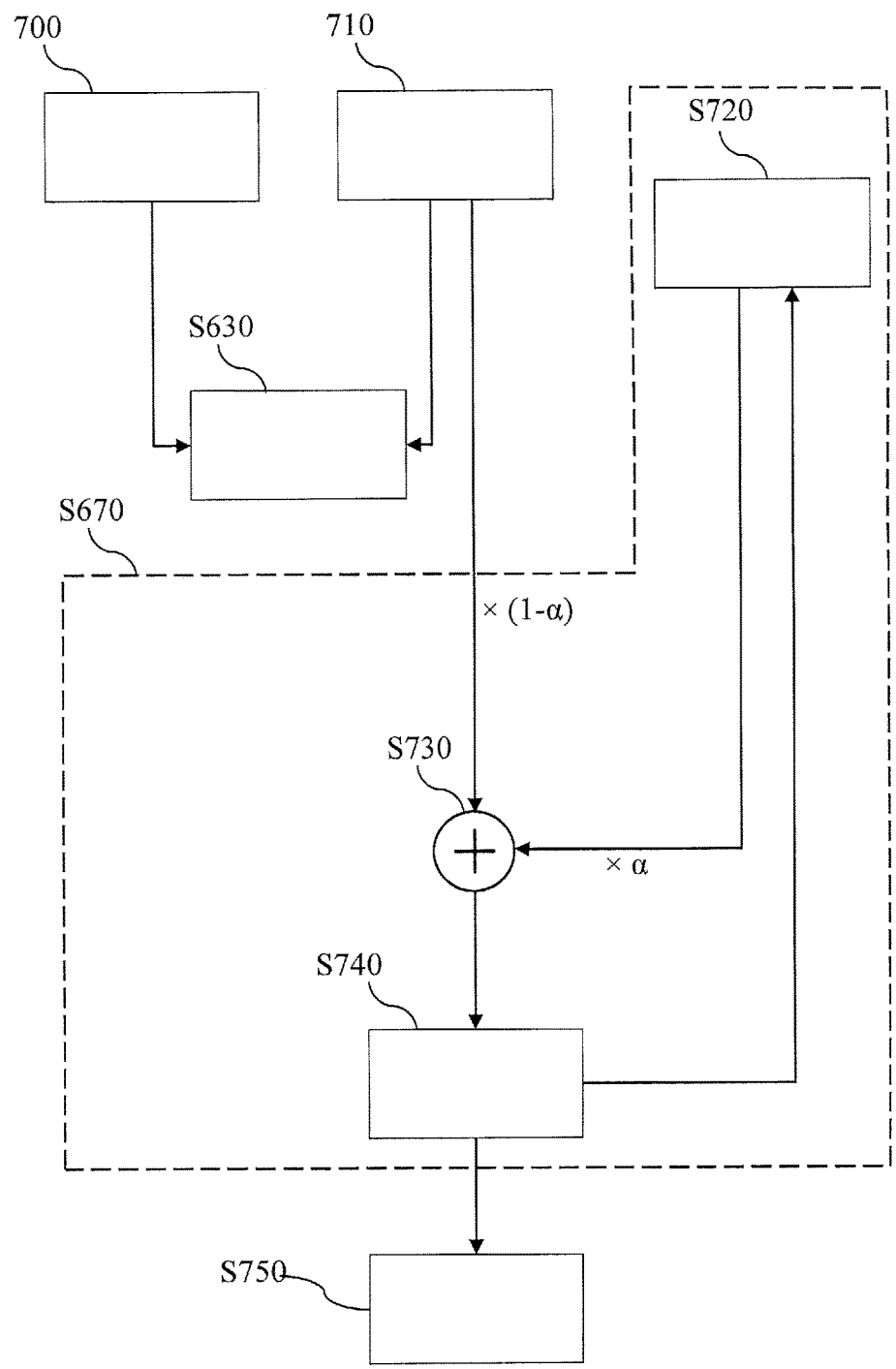
FIG. 7 shows a flow chart of one or more alternative embodiments of a method for recursive stray light compensation for an IR camera.

Referring now to FIGS. 6 and 7, FIG. 6 shows a flow chart of a method for stray light compensation for an IR camera in accordance with one or more embodiments of the present disclosure. For example, the method according to FIG. 6 may comprise the following operations to generate the fixed pattern noise estimate $FPNest_{t0}$ for time t0:

At block S605, optionally obtaining a measured IR image $Y_{meas}$ by subtracting a mean value (e.g., a mean irradiance value of all pixels in the captured IR image) from the captured IR image Y. For example, the measured IR image $Y_{meas}$ may be representative of a rough approximation of stray light present in the captured IR image Y. For embodiments in which block S605 is not performed, other operations of FIG. 6 may be based on the captured IR image Y rather than the measured IR image $Y_{meas}$.

At block S610, optionally down sampling the captured IR image (or the measured IR image depending on embodiments) of the scene to a down-sampled IR image with a predetermined factor, wherein said IR image is down-sampled from a first original resolution or dimension to a second lower or reduced resolution or dimension, thereby reducing computational complexity for the stray light compensation. In one non-limiting example, the IR image is down-sampled with a factor of 80, but any suitable down-sampling factor may be used depending on circumstances. An advantage of down sampling the captured IR image is that the calculations made on a down sampled image have a very low computational complexity.

At block S620, performing a transform on said captured IR image, said measured IR image, or said down-sampled IR image to the frequency domain, thereby obtaining an IR image frequency pattern 560, wherein the frequency pattern comprises frequency components with associated frequency component amplitudes and center frequency, wherein the stray light model and the transformed IR image have frequency patterns with the same number of and corresponding frequency components.

In one non-limiting example, the stray light model and the transformed IR image frequency pattern 560 is represented in matrix form and have corresponding matrix positions, or coordinates, such as row and column or x and y coordinates. In one embodiment, the transform is a Discrete Cosine Transform (DCT) or a Fast Fourier Transform (FFT).

At block S630, determining whether the frequency components of frequency pattern of the transformed IR image fulfill a first condition based on the stray light model. In one or more embodiments, the first condition is that a correlation measure based on the frequency pattern of the transformed IR image and the stray light model exceeds a predetermined threshold value C1.

If it is determined at block S630 that said first condition is fulfilled, the following operations may be performed according to one or more embodiments:

At block S640, generating a truncated IR image frequency pattern 570 by setting the frequency component amplitudes of the transformed IR image frequency pattern 560 corresponding to non-principal components of the stray light model to zero, e.g. by truncating the amplitude value. In one non-limiting example, the truncated IR image frequency pattern 570 may be obtained by applying the shape coefficients mask 580, which may be generated as discussed above for FIG. 5. By generating the truncated IR image frequency pattern 570, the principal components of the IR image frequency pattern may be selected for use in operations that follow.

At block S650, performing an inverse transform (e.g., an inverse DCT, inverse FFT, or other operations that are inverse of the transform performed at block S620) on the truncated frequency pattern 570 to obtain a fixed pattern noise estimate $FPNest_{t0\_delta}$ for time t0.

At block S660, optionally up-sampling the fixed pattern noise estimate $FPNest_{t0\_delta}$ for time t0 with a predetermined factor, not shown in the figure. In one non-limiting example the IR image is up-sampled with a factor of 80, but any suitable up-sampling factor may be used depending on circumstances.

At block S670, determining the fixed pattern noise estimate $FPNest_{t0}$ for time $t_0$. In one or more embodiments, the fixed pattern noise estimate $FPNest_{t0}$ for time $t_0$ is determined based on said fixed pattern noise estimate $FPNest_{t0\_delta}$ for time $t_0$. In one non-limiting example, fixed pattern noise estimate $FPNest_{t0}$ for time $t_0$ is set equal to said fixed pattern noise estimate $FPNest_{t0\_delta}$ for time $t_0$.

In one or more embodiments, determining the fixed pattern noise estimate $FPNest_{t0}$ for time $t_0$ is further based on one or more previously determined fixed pattern noise estimate delta ($FPNest_{t-M}, \ldots, FPNest_{t-2}, FPNest_{t-1}$). In one non-limiting example, determining the fixed pattern noise estimate $FPNest_{t0}$ for time $t_0$ comprises finite impulse response (FIR) filtering said fixed pattern noise estimate $FPNest_{t0\_delta}$ for time $t_0$ and previously determined fixed pattern noise estimate delta ($FPNest_{t-M}$, ..., $FPNest_{t-2}$, $FPNest_{t-1}$) to obtain said fixed pattern noise estimate $FPNest_{t0}$ for time $t_0$.

In one or more embodiments, determining a fixed pattern noise estimate to be used for FPN compensation of the capture IR image is performed recursively/iteratively. This is illustrated in FIG. 7 by blocks comprised within the dashed line representing block 670 of FIG. 6. Any or all of the additional operations (e.g., operations associated with blocks S610, S620, and S640) of FIG. 6 may be performed in combination with operations of FIG. 7.

In the embodiments described in connection with FIG. 7, the fixed pattern noise estimate obtained by the iterative method and used for compensation of the captured IR image is referred to as $FPNest_{adjusted}$ and is an adjusted version of fixed pattern noise estimate $FPNest_{t0}$. In other words, a method according to embodiments of FIG. 6 may comprise: generating an adjusted version of the fixed pattern noise estimate $FPNest_{t0}$, by adjusting the fixed pattern noise estimate $FPNest_{t0}$ iteratively until a second condition is fulfilled, and performing an FPN compensation of the captured IR image based on said adjusted version of the $FPNest_{t0}$ to obtain a stray light compensated IR image.

As illustrated in FIG. 7, there is provided a stray light model 700 that may be obtained according to any of the embodiments presented herein. In one non-limiting example, the stray light model 700 is down-sampled by a preset factor and transformed into the frequency domain before it is input to the method of FIG. 7. According to FIG. 7, there is further provided a captured IR image 710. The IR image 710 may have been captured using the IR camera 3. In one non-limiting example, the IR image 710 is down-sampled by a preset factor and transformed into the frequency domain before it is input to the method of FIG. 7. In other examples, the IR image 710 may represent a measured IR image according to block S605 of FIG. 6 or a down-sampled IR image of such a measured IR image. It is noted that in the following description, the stray light model 700 and the IR image 710 may be represented in the same domain (time or frequency) and have corresponding resolution, for example being represented as matrices of the same dimension and have corresponding matrix positions, or coordinates, such as row and column or x and y coordinates.

Referring again to block S630 of FIG. 6, whether the frequency components of frequency pattern of the transformed IR image fulfill a first condition based on the stray light model may be determined in one or more embodiments. In one or more embodiments, the first condition is that a correlation measure based on the frequency pattern of the transformed IR image and the stray light model exceeds a third predetermined threshold value C1. If it is determined that said first condition is fulfilled, in other words that the captured IR image to a large degree correlates with the model that represents a typical stray light distribution, this means that there is probably stray light in the captured IR image 710 that needs to be compensated for.

In one or more embodiments described in connection with FIG. 7, a method further comprises performing sub-steps (S720, S730, S740) of step S670. The sub-steps are performed recursively/iteratively until a second condition, as checked in step S740, is fulfilled. For example, in one or more embodiments the method of FIG. 7 comprises:

At block S720, determining a fixed pattern noise estimate $FPNest_{t0}$ for time $t_0$. According to one or more embodiments, the fixed pattern noise estimate $FPNest_{t0}$ for time $t_0$ may be represented as a matrix having a resolution corresponding to the resolution of the captured IR image 710 and having corresponding matrix positions, or coordinates, such as row and column or x and y coordinates.

In one embodiment, all values of the fixed pattern noise estimate $FPNest_{t0}$ for time $t_0$ are initially, at the beginning of the first iteration, set to 0. In the following iterations (the second iteration and onwards, at block S720, the fixed pattern noise estimate $FPNest_{t0}$ for time $t_0$ may be adjusted based on a fixed pattern noise estimate $FPNest_{adjusted}$ according to one or more embodiments. The fixed pattern noise estimate $FPNest_{adjusted}$ is the result of operations at S730 and is fed back to block S720 if the second condition, which is checked at block S740, is not fulfilled. This is further described below.

At block S730, the captured IR image 710 and the fixed pattern noise estimate $FPNest_{t0}$ for time $t_0$ may be combined. In one or more embodiments, the fixed pattern noise estimate $FPNest_{t0}$ for time $t_0$ is multiplied with a factor $\alpha$, and the captured IR image 710 is multiplied with a factor $(1-\alpha)$, before combination, wherein $0 \leq \alpha \leq 1$. In one or more embodiments, the start value of $\alpha$ may be preset in production or calibration of the IR imaging device, or it may be set by a user of the IR camera through input using an input device of the IR camera. The value of $\alpha$ is after initialization, according to embodiments, adjusted empirically during the iterations of operations in blocks S720, S730 and S740. The output of the combination of block S730 is a fixed pattern noise estimate $FPNest_{adjusted}$.

At block S740, whether or not the fixed pattern noise estimate $FPNest_{adjusted}$ fulfills a second condition may be determined. In one or more embodiments, the second condition is based on the stray light model. If the fixed pattern noise estimate $FPNest_{adjusted}$ fulfills the second condition, this may mean that the fixed pattern noise estimate $FPNest_{adjusted}$ will provide a sufficient stray light compensation when applied onto the capture IR image 710. In this case, the method may proceeds to block S750. If the fixed pattern noise estimate $FPNest_{adjusted}$ does not fulfills the second condition, the method may proceed to block S720 for another iteration.

In step S750: performing an FPN compensation of the captured IR image 710 based on said fixed pattern noise estimate $FPNest_{adjusted}$ to obtain a stray light compensated IR image. The compensation at block S750 corresponds in some embodiments to block S480 described in connection with FIG. 4, whereby a stray light compensated IR image 490 is obtained.

In embodiments where the stray light model 700 was down-sampled by a preset factor and transformed into the frequency domain before it is input to the method of FIG. 7, one of the two following may apply:
  the fixed pattern noise estimate $FPNest_{adjusted}$ is inverse transformed and up-sampled before the compensation at block S750 is performed; or
  the stray light compensated IR image is inverse transformed and up-sampled after the compensation at block S750.

In one non-limiting example, the FPN compensation may be performed through additive methods, by reducing, or increasing, data values of the captured IR image with data values of the $FPNest_{adjusted}$ depending on how the $FPNest_{adjusted}$ is calculated.

Where applicable, the ordering of various steps described herein can be changed, combined into composite steps, and/or separated into sub-steps to provide features described herein. Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
capturing an infrared (IR) image of a scene;
determining a first IR image frequency pattern associated with the captured IR image, wherein the first IR image frequency pattern comprises first frequency components and associated first frequency component amplitudes;
generating a second IR image frequency pattern based at least on the first IR image frequency pattern and a frequency pattern associated with a stray light model, wherein the frequency pattern associated with the stray light model comprises second frequency components and associated second frequency component amplitudes, wherein the second frequency components comprises a set of principal components and a set of non-principal components, and wherein the generating the second IR image frequency pattern comprises adjusting the first frequency component amplitudes of the first IR image frequency pattern corresponding to the set of non-principal components to obtain the second IR image frequency pattern;
generating a fixed pattern noise (FPN) estimate $FPNest_{t0}$ for time $t_0$ based at least on the second IR image frequency pattern; and
performing an FPN compensation of the captured IR image based on said $FPNest_{t0}$ to obtain a stray light compensated IR image.

2. A method comprising:
capturing an infrared (IR) image of a scene;
generating a fixed pattern noise (FPN) estimate $FPNest_{t0}$ for time $t_0$ using the captured IR image and a stray light model, wherein the generating the fixed pattern noise estimate-comprises:
performing a transform on said captured IR image to a frequency domain thereby obtaining an IR image frequency pattern, wherein the IR image frequency pattern comprises frequency components with associated frequency component amplitudes and a center frequency, and wherein the stray light model and the transformed IR image have frequency patterns with the same number of and corresponding frequency components;
generating a truncated IR image frequency pattern by setting the frequency component amplitudes of the IR image frequency pattern corresponding to non-principal components of the stray light model to zero;
performing an inverse frequency transform on the truncated IR image frequency pattern to obtain a fixed pattern noise estimate $FPNest_{t0\_delta}$ for time $t_0$; and
determining the fixed pattern noise estimate $FPNest_{t0}$ for time $t_0$ based on said fixed pattern noise estimate $FPNest_{t0\_delta}$ for time $t_0$; and
performing an FPN compensation of the captured IR image based on said $FPNest_{t0}$ to obtain a stray light compensated IR image.

3. The method of claim 2, further comprising:
determining whether the frequency components of the IR image frequency pattern fulfill a first condition based on the stray light model, wherein the first condition is that a correlation measure based on the frequency pattern of the transformed IR image and the stray light model exceeds a predetermined correlation threshold value,
wherein the generating the truncated IR image frequency pattern, the performing the inverse frequency transform, and the determining the fixed pattern noise estimate are performed upon determination that the first condition is fulfilled.

4. The method of claim 1, further comprising:
generating an adjusted version of the fixed pattern noise estimate $FPNest_{t0}$, by adjusting the fixed pattern noise estimate $FPNest_{t0}$ iteratively until a condition is fulfilled,
wherein the performing the FPN compensation of the captured IR image is based on said adjusted version of the $FPNest_{t0}$.

5. The method of claim 2, wherein determining the fixed pattern noise estimate $FPNest_{t0}$ for time $t_0$ is further based on previously determined fixed pattern noise estimate deltas $FPNest_{t-M}, \ldots, FPNest_{t-2}, FPNest_{t-1}$.

6. The method of claim 1, wherein the first IR image frequency pattern and the frequency pattern of the stray light model have the same number of and corresponding frequency components.

7. The method of claim 1, wherein the determining the first IR image frequency pattern comprises determining a frequency domain representation of the captured IR image to obtain the first IR image frequency pattern.

8. The method of claim 7, wherein the determining the frequency domain representation comprises performing a transform on the captured IR image to a frequency domain to obtain the frequency domain representation.

9. The method of claim 1, wherein the adjusting comprises setting the first frequency component amplitudes of the first IR image frequency pattern corresponding to the set of non-principal components associated with the stray light model to zero to obtain the second IR image frequency pattern.

10. The method of claim 1, wherein each second frequency component of the stray light model is a principal component in the set of principal components or a non-principal component in the set of non-principal components based at least on the corresponding second frequency component amplitude of the second frequency component and one or more threshold values.

11. The method of claim 1, further comprising:
determining a fixed pattern noise estimate $FPNest_{t0\_delta}$ for time $t_0$ based at least on the second IR image frequency pattern, wherein the fixed pattern noise estimate $FPNest_{t0}$ is based at least on the fixed pattern noise estimate $FPNest_{t0\_delta}$ for time $t_0$.

12. The method of claim 11, wherein the determining the fixed pattern noise estimate $FPNest_{t0\_delta}$ for time $t_0$ is based at least on an inverse frequency transform of the second IR image frequency pattern.

13. The method of claim 11, wherein the fixed pattern noise estimate $FPNest_{t0}$ for time $t_0$ is further based on previously determined fixed pattern noise estimate deltas $FPNest_{t-M}, \ldots, FPNest_{t-2}, FPNest_{t-1}$.

14. The method of claim 1, further comprising:
determining whether the first frequency components of the first IR image frequency pattern fulfill a first condition based on the stray light model, wherein the first condition is that a correlation measure based on the first IR image frequency pattern associated with the captured IR image and the frequency pattern associated with the stray light model exceeds a correlation threshold value, and wherein the generating the second IR image frequency pattern is performed upon determination that the first condition is fulfilled.

15. A system configured to perform the method of claim 1, the system comprising:
   at least one processor configured to perform the determining the first IR image frequency pattern, the generating the second IR image frequency pattern, the generating the FPN estimate $FPNest_{t0}$ for time $t_0$, and the performing the FPN compensation;
   an IR camera configured to perform the capturing the IR image of the scene; and
   a memory circuit configured to store the stray light model.

16. The system of claim 15, wherein the IR camera comprises a housing enclosing the at least one processor and the memory.

17. A system configured to perform the method of claim 2, the system comprising:
   at least one processor configured to perform the generating the $FPNest_{t0}$ for time $t_0$ and the performing the FPN compensation;
   an IR camera configured to perform the capturing the IR image of the scene; and
   a memory circuit configured to store the stray light model.

18. The system of claim 17, wherein the IR camera comprises a housing enclosing the at least one processor and the memory.

* * * * *